(12) United States Patent
Vian et al.

(10) Patent No.: US 8,060,270 B2
(45) Date of Patent: Nov. 15, 2011

(54) SYSTEM AND METHOD FOR INSPECTION OF STRUCTURES AND OBJECTS BY SWARM OF REMOTE UNMANNED VEHICLES

(75) Inventors: John Lyle Vian, Renton, WA (US); Ali Reza Mansouri, Bothell, WA (US); Emad William Saad, Renton, WA (US)

(73) Assignee: The Boeing Company, Chicago, IL (US)

( * ) Notice: Subject to any disclaimer, the term of this patent is extended or adjusted under 35 U.S.C. 154(b) by 499 days.

(21) Appl. No.: 12/124,565

(22) Filed: May 21, 2008

(65) Prior Publication Data

US 2010/0268409 A1    Oct. 21, 2010

Related U.S. Application Data

(60) Provisional application No. 61/032,624, filed on Feb. 29, 2008, provisional application No. 61/032,609, filed on Feb. 29, 2008.

(51) Int. Cl.
*H04N 7/18* (2006.01)
(52) U.S. Cl. .......................................... 701/24; 348/144
(58) Field of Classification Search .................... 701/23, 701/24, 25, 26, 29; 700/245, 264; 180/167, 180/168; 348/144
See application file for complete search history.

(56) References Cited

U.S. PATENT DOCUMENTS

| | | | | |
|---|---|---|---|---|
| 5,036,935 A * | 8/1991 | Kohara | ........................ | 180/168 |
| 5,324,948 A * | 6/1994 | Dudar et al. | ................... | 250/379 |
| 5,351,621 A * | 10/1994 | Tanaka et al. | ................... | 104/94 |
| 5,845,725 A * | 12/1998 | Kawada | ....................... | 180/167 |
| 6,984,952 B2 * | 1/2006 | Peless et al. | ................... | 318/580 |
| 7,218,993 B2 * | 5/2007 | Yasukawa et al. | ........... | 700/245 |
| 2004/0158358 A1 * | 8/2004 | Anezaki et al. | ............... | 700/264 |
| 2005/0217589 A1 * | 10/2005 | Daniel et al. | ............... | 119/51.02 |
| 2006/0079997 A1 * | 4/2006 | McLurkin et al. | ........... | 700/245 |
| 2006/0085106 A1 * | 4/2006 | Gaudiano et al. | ............... | 701/23 |
| 2006/0271251 A1 * | 11/2006 | Hopkins | ........................ | 701/23 |
| 2007/0129847 A1 * | 6/2007 | Ulmer et al. | .................. | 700/245 |
| 2007/0208442 A1 * | 9/2007 | Perrone | .......................... | 700/95 |
| 2008/0033684 A1 | 2/2008 | Vian et al. | | |
| 2009/0118875 A1 * | 5/2009 | Stroud | .............................. | 701/3 |
| 2010/0250022 A1 * | 9/2010 | Hines et al. | ....................... | 701/2 |

OTHER PUBLICATIONS

James E DeVault, Robotic System for Underwater Inspection of Bridge Piers, IEEE Instrument & Measurement Magazine, pp. 32-37, Sep. 2000.*

* cited by examiner

*Primary Examiner* — Thomas Black
*Assistant Examiner* — Marthe Marc-Coleman
(74) *Attorney, Agent, or Firm* — Harness, Dickey & Pierce, P.L.C.

(57) ABSTRACT

A method for inspecting structures that includes using a plurality of independent unmanned mobile vehicles. The unmanned mobile vehicles are equipped with a control and guidance system for enabling each unmanned mobile vehicle to operate autonomously. Each unmanned mobile vehicle may be programmed with an operating program that defines a path of travel for it, relative to a structure to be inspected. The unmanned mobile vehicles are deployed so that they cooperatively form a swarm that travels about the structure. At least one of said unmanned mobile vehicles is used to obtain inspection data of a portion of the structure as it executes its respective operating program.

21 Claims, 3 Drawing Sheets

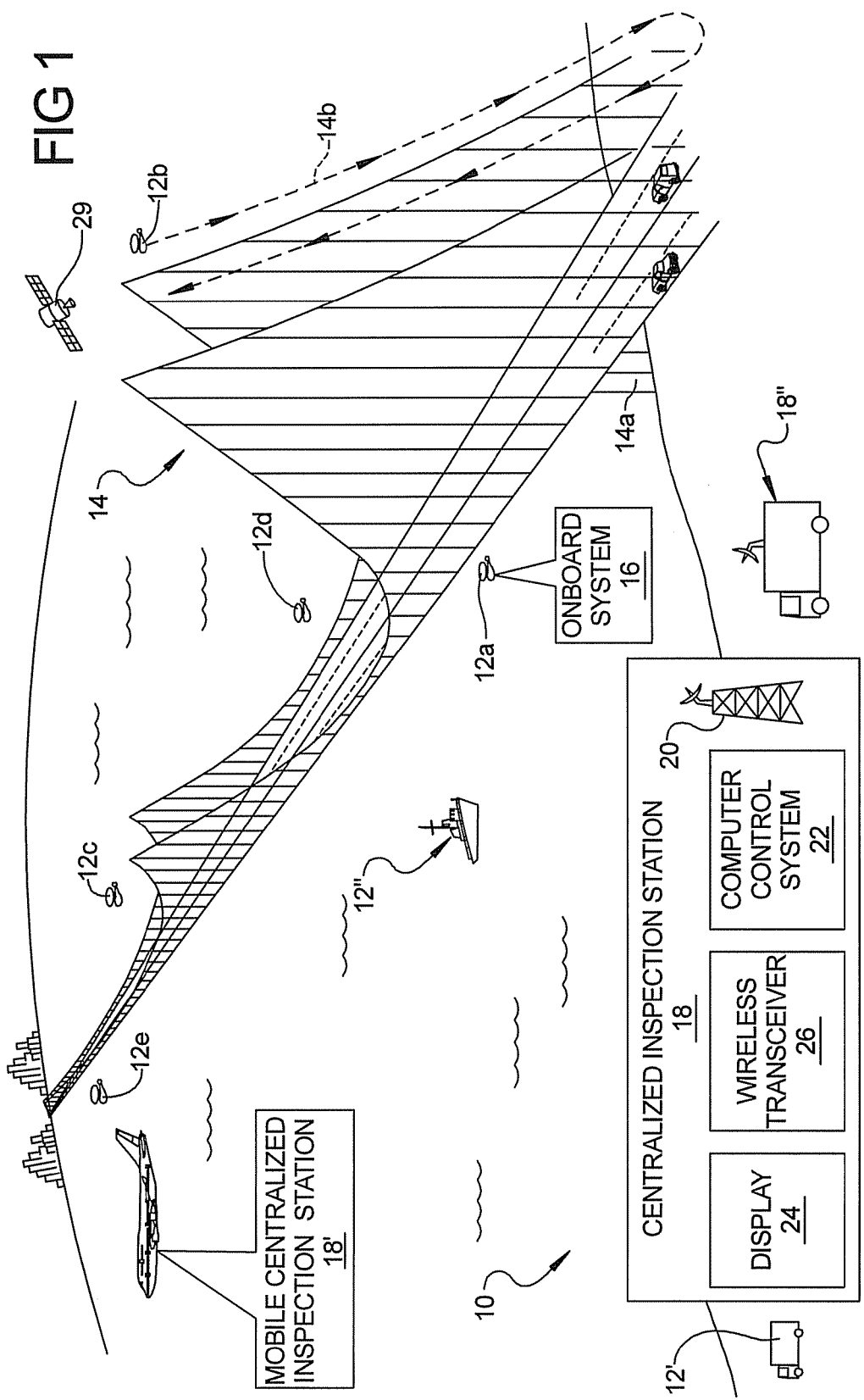

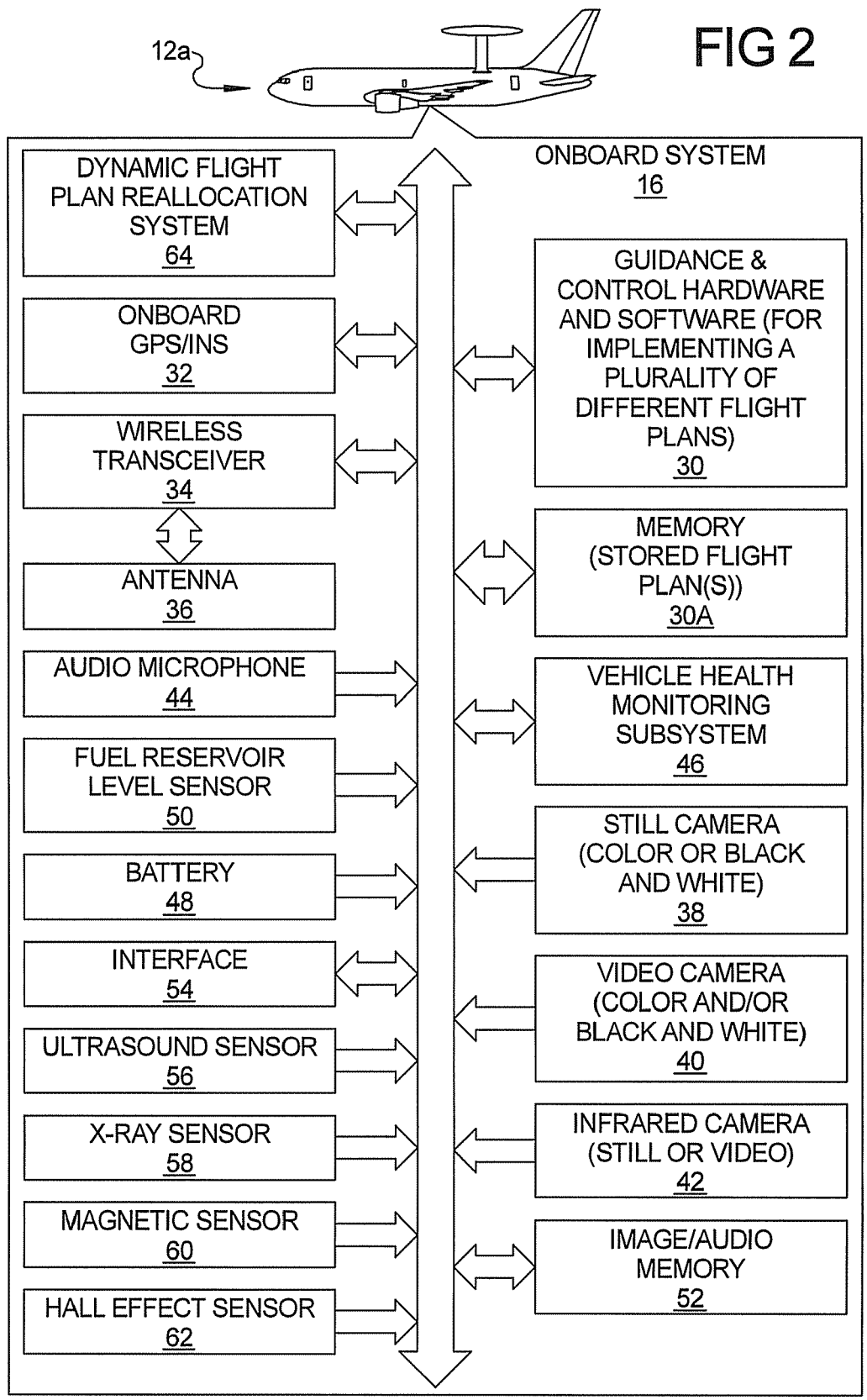

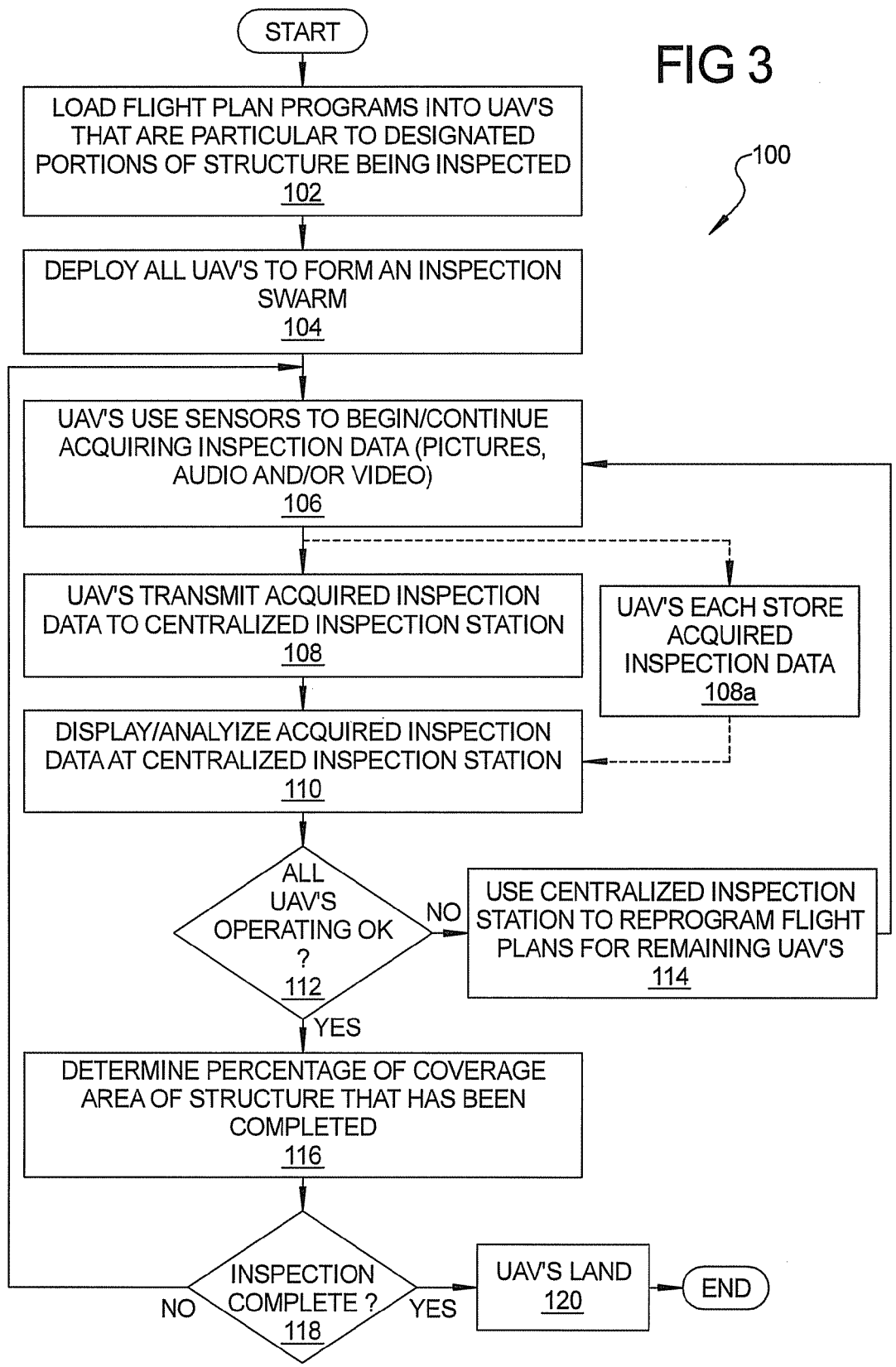

SYSTEM AND METHOD FOR INSPECTION OF STRUCTURES AND OBJECTS BY SWARM OF REMOTE UNMANNED VEHICLES

CROSS-REFERENCE TO RELATED APPLICATIONS

This application takes priority from U.S. Patent Application Nos. 61/032,624 filed Feb. 29, 2008, and 61/032,609 filed Feb. 29, 2008. The disclosures of the above applications are incorporated herein by reference.

This application is related in general subject matter to U.S. patent application Ser. No. 12/124,511, entitled "TRAFFIC AND SECURITY MONITORING SYSTEM AND METHOD" (Boeing Reference 08-0125A) filed concurrently herewith and assigned to the Boeing Company. This disclosure of this application is incorporated herein by reference.

FIELD

The present disclosure relates to systems and methods for performing inspection activities, and more particularly to a system and method for enabling remote inspection of structures or objects by a plurality of unmanned mobile vehicles.

BACKGROUND

The statements in this section merely provide background information related to the present disclosure and may not constitute prior art.

In-person human based inspections of structures and various types of objects can be time consuming, expensive, difficult and often dangerous for an individual to perform. Examples of structures that pose significant challenges in inspecting are bridges, dams, levees, power plants, power lines or electrical power grids, water treatment facilities; oil refineries, chemical processing plants, high rise buildings, infrastructure associated with electric trains and monorail support structures, just to name a few.

The use of static cameras (i.e., fixedly mounted cameras) to provide periodic pictures of a structure or object requiring periodic visual inspection has met with limited effectiveness. Static cameras have a limited field-of-view. Therefore, inspecting a large area, such a power line stretching hundreds of meters or more, is difficult or impossible without using a large number of such cameras. Furthermore, once a camera is mounted in place, it may not be easily accessible for repair or maintenance. The mounting of the camera may require it to be exposed to the elements, which can decrease the reliability and/or cost of operation of the camera.

A static camera mounted near a top of a bridge, to obtain periodic pictures of a structural portion of the bridge, may also be difficult and/or costly to access by an individual if a repair or maintenance becomes necessary. The act of requiring an individual to access a camera mounted high atop a bridge, dam, etc., could also entail significant risk to human safety for the worker or workers charged with such a task.

Occasionally an infrastructure may require inspection where because of environmental, chemical or biological elements the inspection would place a human worker at significant risk to his or her health. Such a situation might be found inside a manufacturing facility, where a periodic regular inspection of a portion of the facility or machines operating within it, in areas where harmful chemicals may be present, needs to be made. Inspection of structural portions of an offshore oil drilling platform would be another example where environmental factors could make the inspection of various parts of the platform by humans fraught with hazard. Still other structures, for example large antennas or telescopes located on mountains, can present situations where inspection by a human presents significant risk to the individual's safety.

In some inspection applications human piloted helicopters have been used to inspect various infrastructures. However, human piloted helicopters can be expensive to operate in terms of asset cost (helicopter, fuel and maintenance) and operational cost (pilot salary). In addition, inspection is limited by the available number of pilots and helicopters and can be hazardous in some instances, such as during rain or dust storms. Also, the use of human piloted helicopters is sometimes simply not possible during inclement weather.

Remote controlled (RC) helicopters are lower in cost but require a trained RC pilot, and thus inspecting a large area with multiple helicopters requires a large number of expensive trained RC pilots. In addition, precision inspection and the time duration during which an inspection operation may be performed can be limited because of the available number of RC pilots and RC helicopters.

SUMMARY

In one aspect the present disclosure relates to a method for inspecting structures. The method may comprise:

using a plurality of independent unmanned mobile vehicles;

equipping each of the unmanned mobile vehicles with a control and guidance system for enabling each unmanned mobile vehicle to operate autonomously;

programming each unmanned mobile vehicle with an operating program that defines a path of travel for each unmanned mobile vehicle, relative to a structure to be inspected;

deploying each unmanned mobile vehicle so that the unmanned mobile vehicles cooperatively form a swarm that travels about the structure; and using at least one of the unmanned mobile vehicles to obtain inspection data of a portion of the structure as it executes its respective operating program.

In another aspect a method for inspecting structures is disclosed. The method may comprise:

using a plurality of independent unmanned mobile vehicles;

equipping each of the unmanned mobile vehicles with a control and guidance system for enabling each unmanned mobile vehicle to operate autonomously;

programming each unmanned vehicle with an operating program that defines a unique path of travel for each unmanned mobile vehicle, relative to a structure to be inspected;

deploying each unmanned mobile vehicle so that the unmanned mobile vehicles cooperatively form a swarm that travels about the structure;

using the unmanned mobile vehicles to obtain images of portions of the structure as each unmanned mobile vehicle executes its respective operating program; and causing each unmanned mobile vehicle to wirelessly transmit the images to a remote centralized inspection station.

In another aspect of the present disclosure a system is disclosed for inspecting structures. The system may comprise:

a plurality of independent unmanned mobile vehicles;

each of the unmanned mobile vehicles having a control and guidance system for enabling each unmanned mobile vehicle to operate autonomously;

each of the unmanned mobile vehicles including an operating program that defines a path of travel for each unmanned mobile vehicle, relative to a structure to be inspected, so that in operation the unmanned mobile vehicles cooperatively form a swarm that moves about the structure; and at least one of the unmanned mobile vehicles including an imaging device to obtain an image of a portion of the structure as it executes its respective operating program.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a block diagram of one implementation of a system in accordance with the present disclosure;

FIG. 2 is a block diagram of the onboard system that may be carried on each of the UAVs shown in FIG. 1; and FIG. 3 is a flowchart of major operations that may be performed by the system of FIG. 1.

DETAILED DESCRIPTION

The following description is merely exemplary in nature and is not intended to limit the present disclosure, application, or uses.

Referring to FIG. 1, there is shown a system 10 for inspecting structures. The system 10 includes a plurality of unmanned mobile vehicles 12 that may be used move around a structure 14 requiring periodic inspection. In this example the unmanned mobile vehicles are illustrated as unmanned aerial vehicles, and more specifically as unmanned rotorcraft (hereinafter after simply referred to as "UAVs" 12), although it will be appreciated that other forms of unmanned vehicles such as unmanned land vehicles 12' and unmanned marine vessels 12" (both surface and underwater) could readily be adapted for use with the present system 10. Also, while the structure 14 is illustrated as a bridge, the system 10 is equally well adapted for use in inspecting a wide range of other structures including, but not limited to, power lines, power generating facilities, power grids, dams, levees, stadiums, large buildings, large antennas and telescopes, water treatment facilities, oil refineries, chemical processing plants, high rise buildings, and infrastructure associated with electric trains and monorail support structures. The system 10 is also particularly well suited for use inside large buildings such as manufacturing facilities and warehouses. Virtually any structure that would be difficult, costly, or too hazardous to inspect by a human piloted vehicle or a human remote controlled (RC) vehicle may potentially be inspected using the system 10.

In FIG. 1, only five UAVs 12a-12e are shown to avoid cluttering the drawing. However, it will be appreciated that a greater or lesser plurality of UAVs 12 could be implemented to meet the needs of a specific inspection task. For large structures such as the bridge 14 shown in FIG. 1, potentially 10-20 UAVs 12 may be desired. Smaller structures may only require 2-5 UAVs to perform the needed inspection task. Each UAV 12a-12e includes an onboard system 16 that is able to navigate the UAV 12 in accordance with a preprogrammed flight plan and to enable inspection data for the structure being inspected to be obtained. The inspection data may comprise pictures, video or audio data, as will be explained in more detail in the following paragraphs.

The preprogrammed flight plan carried by each UAV 12a-12e enables each UAV to follow a unique flight path around a portion of the structure. For Example, UAV 12a may include a flight plan that enables it to fly out to the bridge 14 and circle repeatedly around column 14a, while the flight program of UAV 12b causes UAV 12b to fly down and up along path 14b. UAV 12c may be assigned to fly back and forth under the bridge 14 closely along its horizontal steel structures. Thus, it will be appreciated that for each UAV 12a-12b, its preprogrammed flight plan (and therefore flight path), is unique and is formed with respect to a designated portion of the structure that it is intended to inspect. In this manner each UAV 12 can traverse a specific designated portion of the bridge 14. Once airborne, the UAVs 12a-12e form what can be viewed as a "swarm' of vehicles that enable an extremely thorough inspection of various areas of a structure may otherwise be difficult, costly and/or hazardous for a human piloted vehicle to inspect. Generally, the larger the plurality of UAVs 12 employed in any given inspection task, the shorter the time it will take to complete the inspection task.

For inspection applications, it is anticipated that unmanned rotorcraft, such as unmanned helicopters, may be especially advantageous for use as the UAVs 12. This is because of the ability of an unmanned helicopter to hover and move at very slow speeds. The vertical take-off and landing capability of remote controlled unmanned helicopters also may be highly advantageous in many applications, especially when operating inside of structures or facilities such as manufacturing plants, warehouses, etc., or when inspecting complex facilities such as oil refineries or chemical processing that may have many tall structures clustered (e.g., smoke stacks) clustered closely together. In these applications, the use of a fixed wing unmanned vehicle would necessitate a clear, lengthy area for take-off and landing, and would be difficult, if not impossible, to maneuver around the various vertical structures or within a building. The ability to hover and/or move only vertically, if needed, enables unmanned remote controlled helicopters fly close to and inspect large vertical structures such as vertical support posts of bridges, antennas, or closely against other vertical surfaces such as dams, where the use of a fixed wing unmanned vehicle may have difficulty inspecting.

The UAVs 12 could also be deployed from another airborne vehicle, such as a large transport helicopter or fixed wing aircraft. Such a deployment would obviously save fuel for the UAVs 12, which would enable them to stay airborne for a longer period of time than would otherwise be possible if the UAVs 12 had to take off from a ground based location under their own power.

The system 10 further may include a remote centralized inspection station 18 for receiving wireless communications from each of the UAVs 12a-12e. The centralized inspection station 18 may include an antenna 20, a computer control system 22, a display 24 for viewing by an inspection technician or operator, such as an CRT, LCD or plasma screen, and a wireless transceiver. The wireless transceiver 26 is in communication with the antenna 20 for enabling wireless communication between the computer control system 22 and the onboard system 16 of each UAV 12a-12e. The computer control system 22 may be used to send commands or to monitor various operating performance parameters of each UAV 12a-12e such as fuel remaining, battery power remaining, etc. The computer control system 22 may also be used generate commands to alter the flight plan of any one of the UAVs 12, as will be described in the following paragraphs.

While the centralized inspection station 18 is illustrated as being a terrestrial based station, it could just as readily be formed as a mobile inspection station 18' on an aircraft or human piloted rotorcraft. A land based, mobile inspection station 18" could also be formed. Accordingly, the centralized inspection station 18 does not necessarily need to be a fixed structure or facility. It is also possible for each of the UAVs 12a-12e to communicate with the centralized inspection station 18 via a transponded satellite 29 and/or using a wide area network or a local area network.

Referring to FIG. 2, the onboard system 16 that may be carried by each UAV 12a-12e is shown. It will be appreciated, however, that the onboard system 16 carried by each UAV 12a-12e could include different components, depending on the specific portion of the structure that a given UAV 12 is programmed to inspect. Thus, it is not necessary that the onboard system 16 of each UAV be identical.

The onboard system 16 may include a guidance and control hardware and software system 30 that is able to implement one or more different, stored flight plans from a memory 30a. The onboard system 30 may include a global positioning system (GPS)/inertial navigation system 32 for controlling the orientation of its associated UAV 12 and assisting in carrying out the preprogrammed flight plan stored in the memory 30a. A wireless transceiver 34 and an on board antenna 36 enable bidirectional, wireless electromagnetic wave communications with the centralized inspection station 18.

The onboard system 16 may also include a plurality of different sensors for providing useful inspection information to the centralized inspection station 18. For example, a still camera (color and/or black and white) 38 may be used to obtain still images of portions of the structure 14 being inspected. A video camera 40 may be used to obtain color and/or black and white video of the bridge 14. An infrared camera 42 could also be used to obtain infrared still images or infrared video. An audio microphone 44 could be used to pick up audio signals emanating from the structure being inspected. This feature could be particularly valuable for inspecting large machines inside a manufacturing facility, where the presence of specific types of sounds might be indicative of an imminent machine or component failure. For example, the detection of grinding sounds coming from an elevated portion of a large machine might indicate that a bearing failure is imminent, but such sounds might otherwise not be perceptible by individuals working on a floor of the manufacturing facility where other noise sources are present to mask the grinding noise.

The onboard system 16 may also include a vehicle health monitoring subsystem 44, a battery 48 for powering the electronic devices carried on the UAV 12, as well as a fuel level sensor 50. The vehicle health monitoring subsystem 44 may be used to monitor the battery level of the battery 48 and the fuel reservoir level sensor 50 and generate suitable signals that may be periodically transmitted to the centralized inspection station 18. If an issue develops with any one of the UAVs 12, for example a sudden drop in battery power to an unacceptable level, this enables the centralized inspection station 18 to be wirelessly informed of this condition. The centralized inspection station 18 may then wirelessly upload modified flight programs to the other UAVs 12 that would enable the remaining UAVs 12 to finish the needed inspection task.

The onboard system 16 may optionally also include an image/audio memory 52 for maintaining electronic copies of the images, video or audio captured during an inspection process. If this option is implemented, then an interface 54 may be included on each UAV 12 that enables an external device, for example a lap top computer, to be coupled to the interface 54 and used to download the stored images and/or audio obtained during the previously executed inspection process. The interface 54 could be formed by a conventional RS-232, RS-422, or any other suitable interface. The interface 54 could also be implemented using Blue-tooth technology so that a wireless connection can be made with the image/audio memory 52. The interface 54 could also be used for enabling a wired connection to the UAV 12 to upload programs or other information without the need for a wireless transceiver to be used on the UAV 12. The use of the image/audio memory 52 may be advantageous in environments where periodic high levels of electromagnetic interference are to be expected, which could affect the ability of the acquired images and audio data to be reliably transmitted via electromagnetic wave signals to the centralized inspection station 18.

The onboard system 16 may also include additional sensors such as an ultrasound sensor, an X-Ray sensor 58, a magnetic sensor 60 or a Hall Effect sensor 62. It will be appreciated that the specific type of inspection operation(s) that the system 10 is expected to be used to perform will likely determine the specific form of sensors that will need to be included in the onboard system.

The onboard system 16 may also optionally include a dynamic flight reallocation plan system 64. The dynamic flight plan reallocation system 64 may be used to dynamically change the flight plan used for each UAV 12a-12e in the event one of the UAVs becomes inoperable for any reason, is required to land because of a fuel, battery or detected sensor problem, or for any other reason. By "dynamically" change, it is meant that the system 64 is able to automatically and virtually instantaneously determine which one of a plurality of alternative flight plans should be implemented by the remaining UAVs 12 still in operation so that the overall inspection task can be completed by the remaining UAVs. Thus, if UAV 12a becomes inoperable for any reason, or one of its sensors becomes inoperable, the dynamic flight plan reallocation system 64 of each UAV 12b-12e determines which one of a plurality of alternative pre-stored flight plans it should implement for the remaining UAVs 12b-12d to be able carry out the remainder of the entire inspection task, and the guidance and control hardware 30 will then implement the alternative flight plan in real time. By "real time" it is meant essentially instantaneously. The alternative flight plans may be stored in a memory that is included within the dynamic flight plan reallocation system 64, or the alternative flight plans may be stored in the memory 30A.

Referring to FIG. 3, a flowchart 100 is illustrated that sets forth the operations of one exemplary implementation of the system 10. At operation 102 a flight plan program is loaded into the flight plan memory 30a of each UAV 12a-12e. The flight plan is specific to a designated portion (or portions) of the bridge 14 that the UAV 12 is assigned to inspect. The flight plan is such that it causes its associated UAV 12 to travel on a flight path that takes it sufficiently close to a predetermined portion of the bridge 14 to obtain the needed inspection data, which in this example would be either still images or video.

At operation 104 the UAVs 12a-12e are deployed to form an inspection "swarm". When the UAVs 12 reach the bridge 14 they each begin acquiring inspection data for the portion of the bridge that they have been designated to inspect. The inspection data may consist of still images, video, audio, or even a combination thereof. At operation 108 the UAVs 12a-12e transmit their acquired inspection data to the centralized inspection station 18 via their transceivers 34 and antennas 36. Alternatively the UAVs 12a-12e could each store their acquired inspection data in their image/audio memory 52 for future downloading once they land, as indicated at operation 108*a*.

At operation 110, if the acquired inspection data has been transmitted wirelessly from the UAVs 12*a*-12*e*, then it may be displayed and/or analyzed using the display 24 and/or computer control system 22 of the centralized inspection station 22. At operation 112 a check is then made to make sure that all of the UAVs 12*a*-12*e* are operating properly. If the vehicle health monitoring subsystem 46 on any of the UAVs 12*a*-12*e* has reported a problem with a component or a problem that requires the UAV to land immediately, this condition will be reported to the centralized inspection station 18 via a wireless signal from the affected UAV 12. At this point, the computer control system 22 of the centralized inspection station 18 may be used to transmit a new, alternative flight plan to each of the UAVs 12 that remain in service. This enables the remaining UAVs 12 to carry out the remainder of the inspection task. The new, alternative flight plan could instead be provided to merely one or more of the remaining UAVs, rather than to all of the remaining UAVs. Operations 106-112 may then be repeated. Alternatively, if implemented, the dynamic flight plan reallocation system 64 on each UAV 12 may be used to dynamically determine and implement a new flight that enables the remaining UAVs to complete the inspection task.

At operation 116 a determination is made of the percentage of coverage area of the bridge 14 that has been inspected. For example, it may be accepted that once about 99% of the bridge 14 has been inspected, that a guaranteed probability of detection of a defect or flaw has reached a certain value, and the task may be considered to be completed. The predetermined probability of detection value is checked at operation 118 to determine if the inspection task is essentially now complete. If so, the UAVs 12*a*-12*e* will land, as indicated at operation 120. If not, then operations 106-112 are repeated until the predetermined probability of detection value has been reached.

The system 10 and methodology described herein may be used to inspect a wide range of structures and objects, both stationary and moving. An example of a moving object that may require inspection is a fixed wing aircraft in flight. Using the system 10, the UAVs 12 could be used to fly above, behind, below, or possibly even ahead of the aircraft while it is in flight. The UAVs 12 may be used to obtain images or audio data of the fixed wing aircraft, such as the position of flaps or ailerons, that may be used for real time analysis (i.e., essentially instantaneous analysis). Alternatively, the collected inspection data may be saved by each of the UAVs 12 and downloaded at a later time for analysis.

A particular advantage of the system 10 is that the data acquired by each UAV 12 may be either downlinked in real time to the centralized inspection station 18, thus permitting real time analysis of the data, or saved for analysis at a later time. For data such as video, that requires greater bandwidth to downlink, this feature may be advantageous in certain applications where bandwidth of the downlink is limited, and any potential flaws in the structure being inspected would not be of such nature as to produce conditions that threaten human safety or property. Yet other applications will exist where it would be important to be immediately apprised of a major structural flaw, such as on a bridge heavily traveled by cars and trucks. In such an instance, if a major structural flaw was discovered on a bridge, the real time downlinking capability of the system 10 would enable the acquired inspection images to be processed in real time.

It will be appreciated that the system 10 and methodology will also have particular utility with regard to the inspection of structures that are submerged, or partially submerged, underwater. By using suitable submersible unmanned vehicles, inspection data such as pictures or video of submerged portions of bridges, oil drilling platforms, and even submerged portions of ships can be obtained for analysis.

The various embodiments of the system 10 all provide the advantage that a human operator is not required to pilot each inspection vehicle, nor is a human operator required to remotely control each inspection vehicle. In many applications this is expected to provide a significant cost savings. The system 10 is also beneficial from the standpoint that human pilots do not need to be used in inspection applications that would pose a significant risk to human safety or health.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for inspecting structures, comprising:
  using a plurality of independent unmanned mobile vehicles;
  equipping each of said unmanned mobile vehicles with a control and guidance system for enabling each said unmanned mobile vehicle to operate autonomously;
  programming each said unmanned mobile vehicle with an operating program that defines a predetermined path of travel for each said unmanned mobile vehicle, relative to a structure to be inspected, and;
  deploying each said unmanned mobile vehicle so that said unmanned mobile vehicles cooperatively form a swarm that travels about said structure, with each of said unmanned vehicles following its respective said predetermined path of travel relative to the structure, and further such that each said unmanned mobile vehicle inspects only a designated portion of the structure; and
  using said unmanned mobile vehicles to obtain inspection data in accordance with their respective inspected portions of the structure, as obtained while each said unmanned mobile vehicle executes its respective said operating program, so that an entirety of said structure is inspected.

2. The method of claim 1, wherein using said unmanned mobile vehicles to obtain inspection data for a portions of said structure comprises using a camera on said at least one unmanned mobile vehicle to image an image of a portion of said structure.

3. The method of claim 1, wherein each of said unmanned mobile vehicles obtains images of portions of said structure while executing its respective said operating program.

4. The method of claim 1, wherein programming each said unmanned mobile vehicle with an operating program that defines said predetermined path of travel, relative to a structure to be inspected, comprises programming each said unmanned mobile vehicle with a unique operating program that causes each said unmanned mobile vehicle to follow said predetermined path of travel, relative to said structure.

5. The method of claim 4, wherein each said unmanned mobile vehicle obtains a plurality of images of said structure while following said predetermined path of travel.

6. The method of claim 5, wherein each said unmanned mobile vehicle stores said plurality of images of said structure in an onboard memory.

7. The method of claim 6, wherein said stored images comprise a video stream.

8. The method of claim 1, further comprising using at least one of said unmanned mobile vehicles to wirelessly communicate said inspection data to a remote centralized inspection station for analysis.

9. The method of claim 1, wherein using a plurality of unmanned mobile vehicles comprises using a plurality of unmanned rotorcraft.

10. The method of claim 1, further comprising using a remote centralized inspection station to communicate with said unmanned mobile vehicles and to wirelessly modify said operating programs associated with remaining ones of said mobile unmanned vehicles in real time when one of said unmanned mobile vehicles becomes inoperable.

11. The method of claim 1, wherein using a plurality of unmanned mobile vehicles comprises using one of:
a plurality of unmanned land vehicles;
a plurality of unmanned aerial vehicles; and
a plurality of unmanned marine vehicles.

12. A method for inspecting structures, comprising:
using a plurality of independent unmanned mobile vehicles;
equipping each of said unmanned mobile vehicles with a control and guidance system for enabling each said unmanned mobile vehicle to operate autonomously;
programming each said unmanned mobile vehicle with an operating program that defines a predetermined, unique path of travel for each said unmanned mobile vehicle, each said predetermined, unique path of travel relating to only a designated portion of a structure being inspected;
deploying each said unmanned mobile vehicle so that said unmanned mobile vehicles cooperatively form a swarm with each travelling about said structure in accordance with its respective said predetermined, unique path of travel;
using said unmanned mobile vehicles to obtain images of only portions of said structure, in accordance with their respective said operating programs, as each said unmanned mobile vehicle executes its respective said operating program, so that said unmanned mobile vehicles collectively inspect an entirety of said structure; and
causing each said unmanned mobile vehicle to wirelessly transmit said images to a remote centralized inspection station.

13. The method of claim 12, wherein using a plurality of unmanned mobile vehicles comprises using at least one of:
a plurality of airborne mobile vehicles;
a plurality of mobile land vehicles; and
a plurality of mobile marine vehicles.

14. The method of claim 13, wherein using said unmanned mobile vehicles to obtain images of portions of said structure comprises obtaining at least one of:
color images of portions of said structure;
color video of portions of said structure;
black and white images of portions of said structure;
infrared images of portions of said structure; and
infrared video of portions of said structure.

15. The method of claim 12, wherein using a plurality of unmanned mobile vehicles comprises using a plurality of unmanned rotorcraft.

16. The method of claim 12, further comprising equipping each of said unmanned mobile vehicles with a health monitoring system to monitor at least one operational parameter thereof.

17. The method of claim 12, wherein said images are provided to said remote centralized inspection station in real time.

18. The method of claim 12, further comprising equipping each of said unmanned mobile vehicles with an audio pickup device to pick up audio signals emanating from said structure.

19. A system for inspecting structures, comprising:
a plurality of independent unmanned mobile vehicles;
each of said unmanned mobile vehicles having a control and guidance system for enabling each said unmanned mobile vehicle to operate autonomously;
each of said unmanned mobile vehicles including an operating program that defines a predetermined path of travel for each said unmanned vehicle, relative to only a designated portion of a structure to be inspected, so that in operation said unmanned mobile vehicles cooperatively form a swarm that moves about said structure in accordance with their respective said predetermined paths of travel to cooperatively inspect an entirety of said structure; and
at least one of said unmanned mobile vehicles including an imaging device to obtain an image of a portion of said structure as it executes its respective said operating program.

20. The system of claim 19, further comprising a remote centralized inspection station in wireless communication with each of said unmanned mobile vehicles, and
said at least one of said unmanned mobile vehicles including a wireless transceiver for wirelessly transmitting said image to said remote centralized inspection station while travelling along its said predetermined path of travel.

21. The system of claim 19, wherein said remote centralized inspection station includes a wireless transceiver for wirelessly communicating a different operating program to said at least one unmanned vehicle to assign a new path of travel to said at least one unmanned mobile vehicle.

* * * * *